July 25, 1944.    H. W. GREENUP ET AL    2,354,430
METHOD OF STRENGTHENING POROUS RUBBER ARTICLES
AND ARTICLE PRODUCED
Filed April 3, 1941

Inventor
HAROLD W. GREENUP
AND
LEONARD A. WOHLER

By *Ely & Frye*
Attorneys

Patented July 25, 1944

2,354,430

UNITED STATES PATENT OFFICE 2,354,430

METHOD OF STRENGTHENING POROUS RUBBER ARTICLES AND ARTICLE PRODUCED

Harold W. Greenup, Barrington, and Leonard A. Wohler, Bristol Ferry, R. I., assignors to The Firestone Tire & Rubber Company, Akron, Ohio, a corporation of Ohio Application April 3, 1941, Serial No. 386,698

2 Claims. (Cl. 117—139)

This invention relates to strengthening rubber articles, and more especially to strengthening porous rubber articles without eliminating or destroying the porosity thereof and to the improved porous rubber article obtained.

At the present time, some models, toys and other similar articles are made from cellular rubber by any of several given processes. These articles, especially the toys, are very attractive to both young and old alike, because they have a more lifelike feel and their soft porous surface is attractive and gives a lifelike look and feel to the article. However, cellular rubber made into toys of this nature has low tear resistance and tensile strength in comparison with previous types of toys, so that the porous articles are easily torn, or a section thereof gouged out. A further disadvantage of the porous rubber articles is that they do not receive paint well, whereas it is desirable to paint faces and clothes upon the articles in many cases.

The general object of the present invention is to overcome the foregoing and other objections to present types of porous rubber articles and to provide a novel method of strengthening the porous articles without destroying the porosity thereof.

A further object of the invention is to reinforce the surface of porous articles without destroying the porosity thereof, or without changing the smooth, lifelike resilience, or feel, of the surface of the article.

A further object of the invention is to adapt surfaces of porous rubber articles for receipt of paint.

Figure 1:
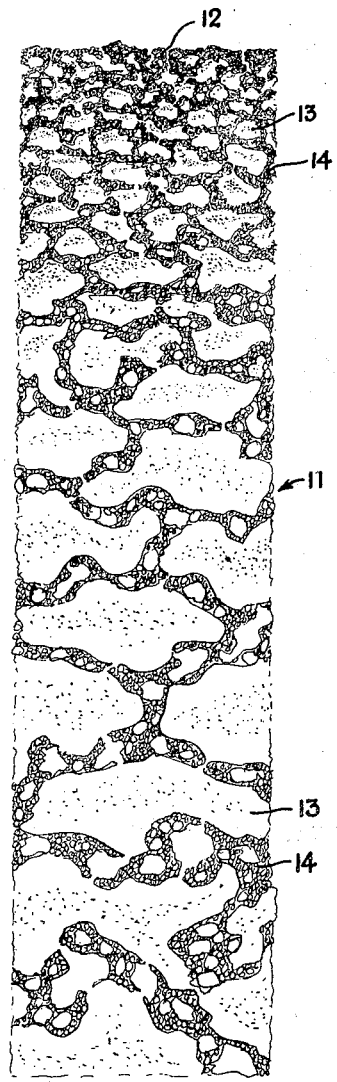
Figure 2:
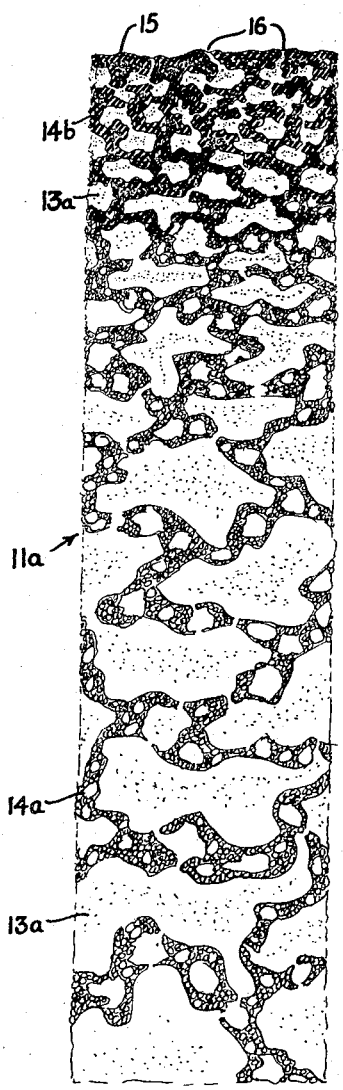

The above and further objects will be manifest in the following description of the invention and in the accompanying drawing, in which:

Fig. 1 is an enlarged view of the cell structure of a cellular rubber article prior to treatment according to the present invention; and Fig. 2 is a similar view of the cell structure of a cellular rubber article which has been treated according to the present invention.

The process of the invention may be practiced with any desired type of cellular rubber article, one suitable method for forming such articles being given in the copending application of Mitchell Carter, filed April 19, 1940, under Serial No. 330,541, now Patent No. 2,290,622.

The porous cellular rubber article to be reinforced is dipped into a thin, or very fluid, dispersion of rubber for a very short time, in order to cover the surface of the article with dispersion and to enable the dispersion to penetrate into the article a slight distance. Then the article is removed from the rubber dispersion and the dispersion carried by the article is deposited thereon by drying same at a suitable temperature, such as between 150° to 200° F. for an hour or so. Usually the rubber dispersion is made from natural latex and contains vulcanizing ingredients adapted to vulcanize the dispersion at a low temperature. Hence, the rubber deposited out in the porous article during the drying operation is partially vulcanized at that time and thereafter completes its vulcanization at room temperature.

Referring to the drawing, in which similar numerals are used to designate similar parts, a portion of an untreated cellular rubber article 11 is shown in Fig. 1 enlarged approximately 30 times to show the cell structure thereof. Near the surface 12 of the article the cells 13 are relatively small, whereas they gradually become larger towards the interior of the article. Also, the cell walls 14 are thinner near the surface of the article than in the interior thereof. In addition to the porosity of the cellular article due to the cells 13, 13, the cell walls 14, 14 are also porous, as is clearly shown in Fig. 1. This latter porosity is especially characteristic of cellular rubber made directly from aerated latex, such as the cellular rubber described in the application of Mitchell Carter, above-identified.

Fig. 2 is a similar view of a treated cellular rubber article 11a enlarged approximately 30 times. The cells 13a are substantially unchanged from the cells 13 in Fig. 1, and the same is true of those cell walls 14a towards the interior of the article 11a. However, the porosity of those cell walls 14b near the surface of the article has been materially reduced and the strength of the walls 14b is much greater than the strength of untreated walls 14. The surface of the article has also been covered by a thin rubber film 15 which is imperceptible to the naked eye, but which further strengthens the surface of the article and renders same more receptive to paint and less absorptive of paint. The surface of the treated article still contains sufficient pores 16 to allow circulation of a fluid into and out of the article when the latter is pressed or flexed in a fluid medium. Fig. 2 clearly shows, therefore, that the treatment of the invention, applied to a cellular rubber article 11, has caused the porous cell walls 14b near the surface of the article to be impregnated and strengthened by solid rubber.

One suitable composition for treating porous articles is composed as follows:

|  | Dry | Wet |
|---|---|---|
| 57% latex | 100 | 175.5 |
| 50% aqueous dispersion of zinc oxide | .5 | 1.0 |
| 50% aqueous dispersion of sulfur | 2 | 4.0 |
| 50% aqueous dispersion of piperdinium pentamethylene dithiocarbamate | .75 | 1.50 |
| 40% aqueous dispersion of zinc mercaptobenzothiazole | .5 | 1.25 |
| Water |  | 158.5 |
| Wetting agent | .5 | .5 |
| 30% aqueous dispersion of titanium oxide | 5 | 16.7 |
|  | 109.27 | 358.95 |

It will be seen that the total solids content of the composition is 30.5%, which adapts the fluid composition to enter the pores of the rubber articles. It will be appreciated that the composition used may be varied appreciably, dependent upon the specific conditions of use. That is, various ingredients can be introduced into the composition to change its viscosity, or surface tension in order to speed up, or impede entrance of the dispersion into the cells of the porous articles. Any suitable wetting agent, such as Ultrawet (aromatic monosodium sulfonate), or Aquarex D. (The sodium salts of the one-half sulfate ester of a mixture of higher fatty alcohols which chiefly comprise lauryl and myristyl derivatives), may be used in the composition given.

In one example of practice of the invention, a small, vulcanized porous rubber doll weighing 55 grams was immersed in the above listed composition for five seconds. Next the article was removed from the dispersion and dried at a temperature of 160° F. for about four hours. The article had increased in weight 5 grams and had a substantially unchanged appearance or feel, but was greatly increased in surface strength. The porosity of the surface was reduced, but not completely eliminated, nor was there a coating of rubber apparent on the surface of the doll. However, such surface was appreciably more receptive to paint, and did not absorb paint as does an untreated article. Hence, it will be seen that an improved method of strengthening porous rubber articles without destroying the porosity thereof has been provided by the invention, and the objects thereof have been achieved.

In certain cases, it may be desirable to use vulcanized latex, or rubber dispersion in forming the rubber coating on the porous rubber article. Then the drying time for the latex coated article probably could be reduced.

The detailed description of the particular embodiment of the invention illustrated and described herein is not to be construed as limiting the invention thereto. The invention includes all features of patentable novelty residing in the foregoing description.

We claim:

1. A cellular rubber article characterized by an interior region of relatively low strength and high porosity and a surface region of relatively high strength and low porosity, the cell walls in said surface region being strengthened by a solid latex rubber deposit within the pores thereof and the surface of the article having a thin porous coating of solid latex rubber thereon.

2. A method of treating porous cellular rubber articles, comprising immersing the article in a fluid latex composition to impregnate the surface portions of the article without appreciably impregnating the interior portions thereof, removing the article from said composition, drying the article to deposit solid latex rubber from said composition in and on the cell walls of the article at and adjacent the surface thereof without depositing an appreciable amount of solid latex rubber in the interior portions of the article, and without closing the pores in the surface portion, whereby to strengthen said surface portions and to render said surface paint-receptive but substantially non-absorptive of paint, while leaving the interior portions in a light-weight, porous, unimpregnated condition, and painting the article upon a portion of its porous latex-treated surface.

HAROLD W. GREENUP.
LEONARD A. WOHLER.